(12) United States Patent
Ohashi (10) Patent No.: US 12,132,390 B2
(45) Date of Patent: Oct. 29, 2024

(54) ELECTRONIC CIRCUIT UNIT AND BATTERY PACK

(71) Applicant: SANYO Electric Co., Ltd., Kadoma (JP)

(72) Inventor: Osamu Ohashi, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 113 days.

(21) Appl. No.: 17/951,165

(22) Filed: Sep. 23, 2022

(65) Prior Publication Data

US 2023/0018700 A1 Jan. 19, 2023

Related U.S. Application Data

(63) Continuation of application No. PCT/JP2021/012182, filed on Mar. 24, 2021.

(30) Foreign Application Priority Data

Mar. 30, 2020 (JP) ................................. 2020-061460

(51) Int. Cl.
*H02M 1/08* (2006.01)
*H02M 3/156* (2006.01)

(52) U.S. Cl.
CPC ............ *H02M 1/08* (2013.01); *H02M 3/156* (2013.01)

(58) Field of Classification Search
CPC ................................. H02M 1/08; H02M 3/156
USPC .......................................... 327/142, 143, 198
See application file for complete search history.

(56) References Cited

U.S. PATENT DOCUMENTS 6,876,237 B2 * 4/2005 Lee ........................... G06F 1/24
327/143
8,624,648 B2 * 1/2014 Kim ...................... H03K 3/0375
327/198
8,872,554 B2 * 10/2014 Balmelli .............. H03K 17/223
327/143

FOREIGN PATENT DOCUMENTS

JP 107-64678 A 3/1995
JP 2009-122934 A 6/2009
JP 2017-083801 A 5/2017

OTHER PUBLICATIONS

International Search Report dated May 25, 2021, issued in counterpart Application No. PCT/JP2021/012182. (2 pages).

\* cited by examiner

*Primary Examiner* — Ryan Johnson
*Assistant Examiner* — Colleen J O'Toole
(74) *Attorney, Agent, or Firm* — WHDA, LLP (57) ABSTRACT

An electronic circuit unit includes a trigger circuit and a circuit module. The trigger circuit includes a semiconductor switching element configured to output a switching pulse signal in response to an external trigger signal, a load resistor for the semiconductor switching element, a one-shot pulse circuit configured to convert the switching pulse signal into a one-shot pulse with a predetermined pulse width, and a forcible-reset circuit connected to an input side of the semiconductor switching element. The one-shot pulse circuit includes a coupling capacitor connected to an input side of the semiconductor switching element and a charging resistor for the coupling capacitor. The pulse width of the one-shot pulse is determined by a time constant of the coupling capacitor and the charging resistor. The forcible-reset circuit is configured to temporarily input an on-voltage (Continued)

to the semiconductor switching element so as to forcibly switch the circuit module to the operating mode.

8 Claims, 3 Drawing Sheets

ELECTRONIC CIRCUIT UNIT AND BATTERY PACK

CROSS-REFERENCE TO RELATED APPLICATIONS

The present application is a continuation application of PCT application No. PCT/JP2021/012182, filed on Mar. 24, 2021, the disclosure of which is hereby incorporated by reference in its entirety.

TECHNICAL FIELD

The present invention relates to an electronic circuit unit configured to be switched between an operating mode and a power-saving mode, and reduces power consumption in the operating mode.

BACKGROUND ART

An electronic circuit unit configured to be switched between an operating mode and a power-saving mode to reduce power consumption has been used for various applications. For example, a battery pack including the electronic circuit unit has advantageous features that power consumption not in use is reduced to prolong the battery usage time, and the mode is switched to the power-saving mode in a storage state to prolong the storage period. The electronic circuit unit includes a circuit module configured to be switched from the power-saving mode to the operating mode. The circuit module is switched from the power-saving mode to the operating mode upon detecting a start-up signal (PTL 1).

CITATION LIST

Patent Literature

PTL 1: Japanese Patent Laid-Open Publication No. 2017-083801

SUMMARY OF THE INVENTION

Technical Problem

A electronic circuit unit configured to be switched between the operating mode and the power-saving mode is switched between the power-saving mode and the operating mode in response to an external trigger signal input to an external input terminal. In the operating mode, a device including the electronic circuit unit is used. In the power-saving mode, the device is not in use and power consumption is reduced. The electronic circuit unit configured to be switched between the operating mode and the power-saving mode is required to be switched from the operating mode to the power-saving mode depending on the usage environment. When a predetermined condition, such as no use of the device for a long time, is met, a built-in microcomputer or the like determines this state to switch the operating mode to the power-saving mode. The electronic circuit unit internally includes a start-up terminal in order to switch to the operating mode in response to an external trigger signal input from the outside. The electronic circuit unit is switched to the operating mode upon the trigger signal input from outside and a high-level switching pulse signal input to the start-up terminal. The electronic circuit unit switches the operating mode to the power-saving mode to reduce power consumption, for example, under the condition that the period when not in use is lengthy during the operating mode. When the start-up terminal is at a high level at the time of switching from the operating mode to the power-saving mode, the switching cannot be performed to the power-saving mode. Hence, in order to forcibly set the start-up terminal to a low level when a predetermined period of time elapses after the switching to the operating mode, a conventional electronic circuit unit includes a short-circuiting circuit which changes the start-up terminal from a high level to a low level after a predetermined period of time.

When a predetermined period of time elapses, the short-circuiting circuit turns on a switching element and short-circuits the start-up terminal to the ground line for forcibly setting to a low level, so that the high level of the start-up terminal is forced to the low level. Since the switching element, such as a field-effect transistor (FET), is turned on and the start-up terminal is maintained at the low level, power is consumed via the FET which is turned on, which is a drawback.

Moreover, the conventional electronic circuit unit is set in a connection device, and an external trigger signal is input from the connection device to the electronic circuit unit, so that switching to the operating mode is performed. However, while the electronic circuit unit is disconnected from the connection device in the power-saving mode, the switching to the operating mode cannot be performed. Hence, the electronic circuit unit is reconnected to the connection device in order to perform the switching to the operating mode.

The present invention has been conceived to eliminate the above drawbacks. A first object of the present invention is to provide an electronic circuit unit in which an extremely simple one-shot pulse circuit sets a start-up terminal to a low level when a predetermined period of time elapses after switching to the operating mode, so that the operating mode can be switched to the power-saving mode at a required timing.

A second object of the present invention is to provide an electronic circuit unit capable of performing switching to the operating mode while the an electronic circuit unit in the power-saving mode is disconnected from the connection device.

Solution to Problem

An electronic circuit unit according to an aspect of the present invention includes: a trigger circuit configured to output a switching pulse signal in response to an external trigger signal provided to an external input terminal; and a circuit module including a start-up terminal, the circuit module is configured to operate in an operating mode and a power-saving mode which are switched in response to the switching pulse signal from the trigger circuit to the start-up terminal. The trigger circuit includes: a semiconductor switching element configured to output the switching pulse signal to the start-up terminal in response to the external trigger signal; a load resistor for the semiconductor switching element; a one-shot pulse circuit configured to convert the switching pulse signal to be input to the start-up terminal into a one-shot pulse with a predetermined pulse width; and a forcible-reset circuit connected to an input side of the semiconductor switching element, the forcible-reset circuit being configured to temporarily turn on the semiconductor switching element. The start-up terminal is connected to a node connected to the semiconductor switching element and the load resistor. The one-shot pulse circuit includes: a coupling capacitor connected to the input side of the semiconductor switching element; and a charging resistor for the coupling capacitor. The predetermined pulse width of the one-shot pulse is determined by a time constant of the coupling capacitor and the charging resistor. The forcible-reset circuit is configured to temporarily input an on-voltage to the semiconductor switching element so as to forcibly switch the circuit module to the operating mode.

A battery pack according to an aspect of the present invention includes the electronic circuit unit and a chargeable battery. A voltage of the voltage is configured to be supplied to the electronic circuit unit and the semiconductor switching element.

Advantageous Effects of Invention

The electronic circuit unit described above includes a one-shot pulse circuit with an extremely simple circuit configuration including a coupling capacitor and a charging resistor, so that power consumption in the operating mode can be reduced. Moreover, the electronic circuit unit can be switched to the operating mode while being disconnected from the connection device in the power-saving mode, without requiring reconnection to the connection device. With such a feature, an operation, such as lighting of a light-emitting diode (LED) that displays the remaining capacity of the battery, can be performed.

DESCRIPTION OF EMBODIMENT

Figure 3:
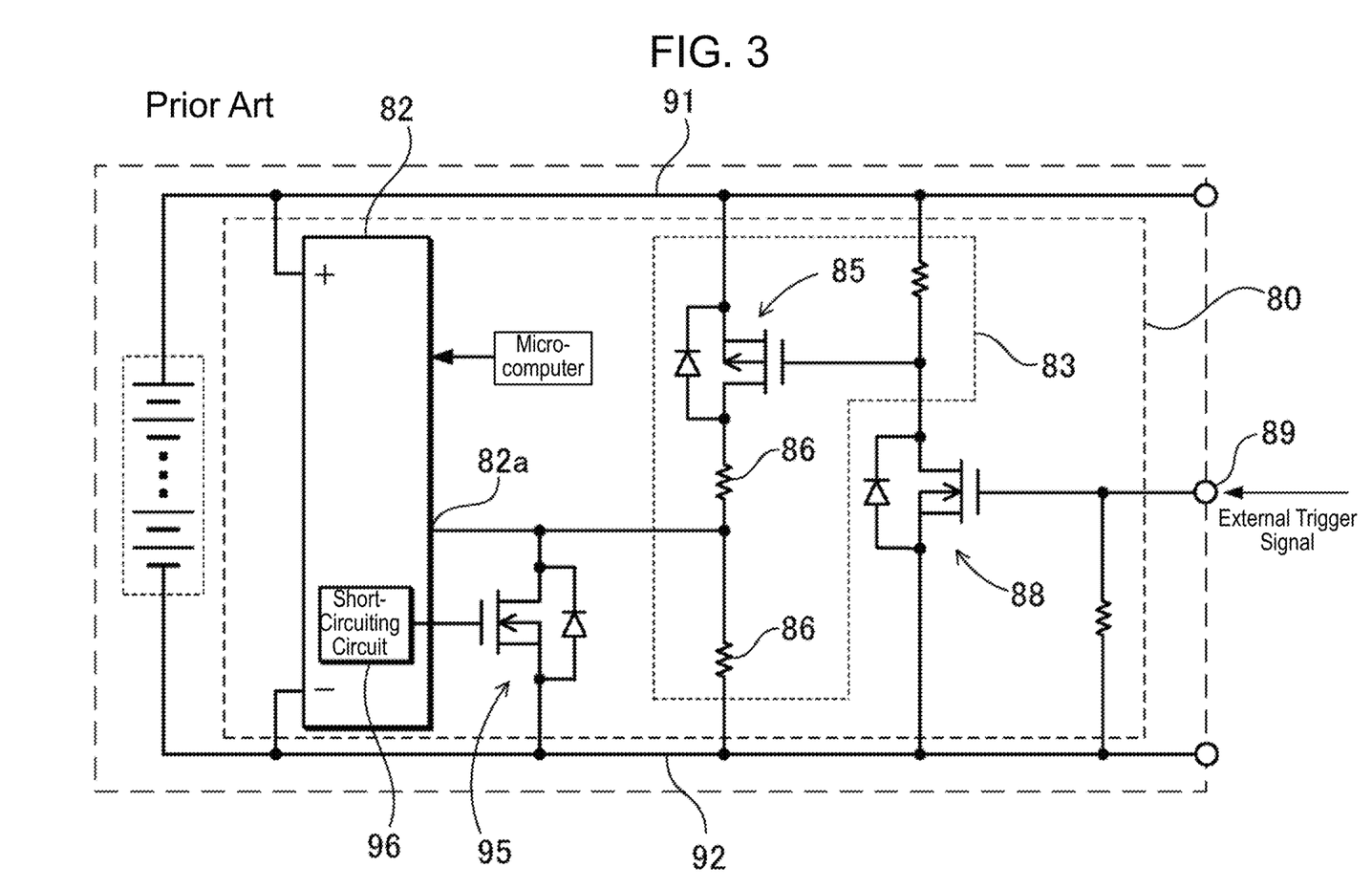
FIG. 3 is a block diagram of a conventional battery pack.

FIG. 3 is a block diagram of conventional electronic circuit unit 80. Electronic circuit unit 80 illustrated in FIG. 3 includes circuit module 82 including a circuit which switches an operating mode, and trigger circuit 83 which converts an external trigger signal into a switching pulse signal and provides the switching pulse signal to start-up terminal 82a of circuit module 82. Trigger circuit 83 includes p-channel FET 85 connected to the positive side of power line 91, and inputs a voltage of load resistor 86 for FET 85 to start-up terminal 82a. In trigger circuit 83, p-channel FET 85 is turned on in response to an external trigger signal input to the gate of FET 85 via external input terminal 89 and inverting circuit 88 to turn on FET 85 to energize trigger circuit 83, and trigger circuit 83 input a high-level signal generated in load resistor 86 to start-up terminal 82a of circuit module 82 as a switching pulse signal. Circuit module 82 is switched from the power-saving mode to the operating mode when the switching pulse signal input to start-up terminal 82a is changed from a low level to a high level.

Electronic circuit unit 80 shown in FIG. 3 includes short-circuiting FET 95 which forcibly causes the voltage of start-up terminal 82a to be at a low level in order to cause start-up terminal 82a to be at a low level when a predetermined period of time elapses after switching to the operating mode. On and off of Short-circuiting FET 95 is controlled by short-circuiting circuit 96. Short-circuiting FET 95 is disposed outside circuit module 82, and short-circuiting circuit 96 is mounted on circuit module 82. When a predetermined period of time elapses after switching to the operating mode, short-circuiting circuit 96 inputs an on-voltage to the gate of short-circuiting FET 95, turning on FET 95. Short-circuiting FET 95 which is turned on connects start-up terminal 82a to ground line 92 to forcibly bring the high level of start-up terminal 82a to a low level. Short-circuiting circuit 96 turns on a switching element, such as short-circuiting FET 95, and forcibly maintains start-up terminal 82a at a low level. As a result, short-circuiting FET 95 which is turned on consumes power, increasing power consumption in the operating mode.

After electronic circuit unit 80 in FIG. 3 is switched to the operating mode, the high level of the switching pulse signal of start-up terminal 82a can be set to the low level by short-circuiting circuit 96. However, since short-circuiting FET 95 is energized to forcibly set start-up terminal 82a to the low level, short-circuiting FET 95 consumes power. Accordingly, electronic circuit unit 80 shown in FIG. 3 consumes power in the operating mode in which power consumption is required to be reduced as much as possible. In addition, short-circuiting FET 95 and short-circuiting circuit 96 for controlling turning on and off of short-circuiting FET 95 are required in circuit module 82, leading to a complicated circuit configuration and an increased manufacturing cost.

Electronic circuit unit 80 shown in FIG. 3 cannot be switched to the operating mode while electronic circuit unit 80 in the power-saving mode is disconnected from a connection device in the power-saving mode, and electronic circuit unit 80 is required to be reconnected to the connection device in order to switch to the power-saving mode, which is a troublesome operation.

The present invention will be detailed below with reference to the drawings. In the following description, when appropriate, terms which indicate specific directions or locations (for example, "up," "down," and other terms expressing those) may be applied. However, those terms are used for easy understanding of the invention with reference to the accompanying drawings, and thus the technical scope of the present invention shall not be limited by the meaning of those terms. In addition, like numerals appearing in different drawings indicate like parts or members.

Moreover, the embodiment described below illustrates a specific example of the technical idea of the present invention, and the present invention is not limited to the description below. Unless otherwise specified, any dimensions, materials, shapes, and relative arrangements of the structural components described below are given as an example and not as a limitation of the scope of the present invention. In addition, the description in one embodiment or examples may be applied to other embodiments or examples. Additionally, the sizes, the positional relations and the like of the members illustrated in the drawings may be exaggerated in order to clarify the explanation.

An electronic circuit unit according to a first aspect of the present invention includes: a trigger circuit configured to output a switching pulse signal in response to an external trigger signal provided to an external input terminal; and a circuit module including a start-up terminal, the circuit module is configured to operate in an operating mode and a power-saving mode which are switched in response to the switching pulse signal from the trigger circuit to the start-up terminal. The trigger circuit includes: a semiconductor switching element configured to output the switching pulse signal to the start-up terminal in response to the external trigger signal; a load resistor for the semiconductor switching element; a one-shot pulse circuit configured to convert the switching pulse signal to be input to the start-up terminal into a one-shot pulse with a predetermined pulse width; and a forcible-reset circuit connected to an input side of the semiconductor switching element, the forcible-reset circuit being configured to temporarily turn on the semiconductor switching element. The start-up terminal is connected to a node connected to the semiconductor switching element and the load resistor. The one-shot pulse circuit includes: a coupling capacitor connected between the input side of the semiconductor switching element and the external input terminal; and a charging resistor for the coupling capacitor. The predetermined pulse width of the one-shot pulse is determined by a time constant of the coupling capacitor and the charging resistor. The forcible-reset circuit is configured to temporarily input an on-voltage to the semiconductor switching element so as to forcibly switch the circuit module to the operating mode.

The one-shot pulse circuit in the electronic circuit unit has an extremely simple circuit configuration including the coupling capacitor and the charging resistor. Hence, the electronic circuit unit reduces power consumed when the start-up terminal is at a low level with an extremely simple circuit configuration, leading to an extremely low power consumption. Moreover, the forcible-reset circuit of the electronic circuit unit temporarily turns on the semiconductor switching element. Hence, while the electronic circuit unit in the power-saving mode is disconnected from the connection device, switching to the operating mode can be performed without requiring reconnection to the connection device, facilitating convenience.

The electronic circuit unit includes a forcible-reset circuit connected to the input side of the semiconductor switching element. The forcible-reset circuit is configured to temporarily turn on the semiconductor switching element. The forcible-reset circuit temporarily inputs an on-voltage to the semiconductor switching element to forcibly switch the circuit module to the operating mode. Even in the usage environment where no external trigger signal is input while the electronic circuit unit is disconnected from the connection device, the circuit module can be switched to the operating mode without reconnection to the connection device.

In an electronic circuit unit according to a second aspect of the present invention, the forcible-reset circuit includes: a series circuit including a coupling capacitor and a charging resistor; and a reset terminal connected to an input side of the coupling capacitor. The forcible-reset circuit is configured to temporarily turn on the semiconductor switching element in response to a forcible-reset signal input to the reset terminal.

In an electronic circuit unit according to a third aspect of the present invention, the forcible-reset circuit includes: a series circuit including a coupling capacitor and a charging resistor; and a short-circuiting switch connected to an input side of the coupling capacitor of the forcible-reset circuit. The short-circuiting switch is configured to, upon being turned on, connect the input side of the coupling capacitor to a ground line so as to temporarily turn on the semiconductor switching element.

In an electronic circuit unit according to a fourth aspect of the present invention, the time constant is determined by a capacitance of the coupling capacitor and a resistance of the charging resistor such that the predetermined pulse width of the one-shot pulse is equal to or longer than 1 msec.

In an electronic circuit unit according to a fifth aspect of the present invention, the semiconductor switching element is a field-effect transistor (FET).

An electronic circuit unit according to a sixth aspect of the present invention includes a charging resistor connected between the input side of the semiconductor switching element and the coupling capacitor. The coupling capacitor is charged through a series resistance of the charging resistor and the charging resistor.

In an electronic circuit unit according to a seventh aspect of the present invention, the charging resistor is connected to the external input terminal and a power line.

In an electronic circuit unit according to an eighth aspect of the present invention, the circuit module is configured to be switched from the power-saving mode to the operating mode in response to the switching pulse signal with a high level. The semiconductor switching element is configured to cause the switching pulse signal with a high level to the start-up terminal upon being turned on. The one-shot pulse circuit is configured to charge the coupling capacitor through the charging resistor to switch the start-up terminal from the high level to a low level.

Exemplary Embodiment 1

Figure 1:
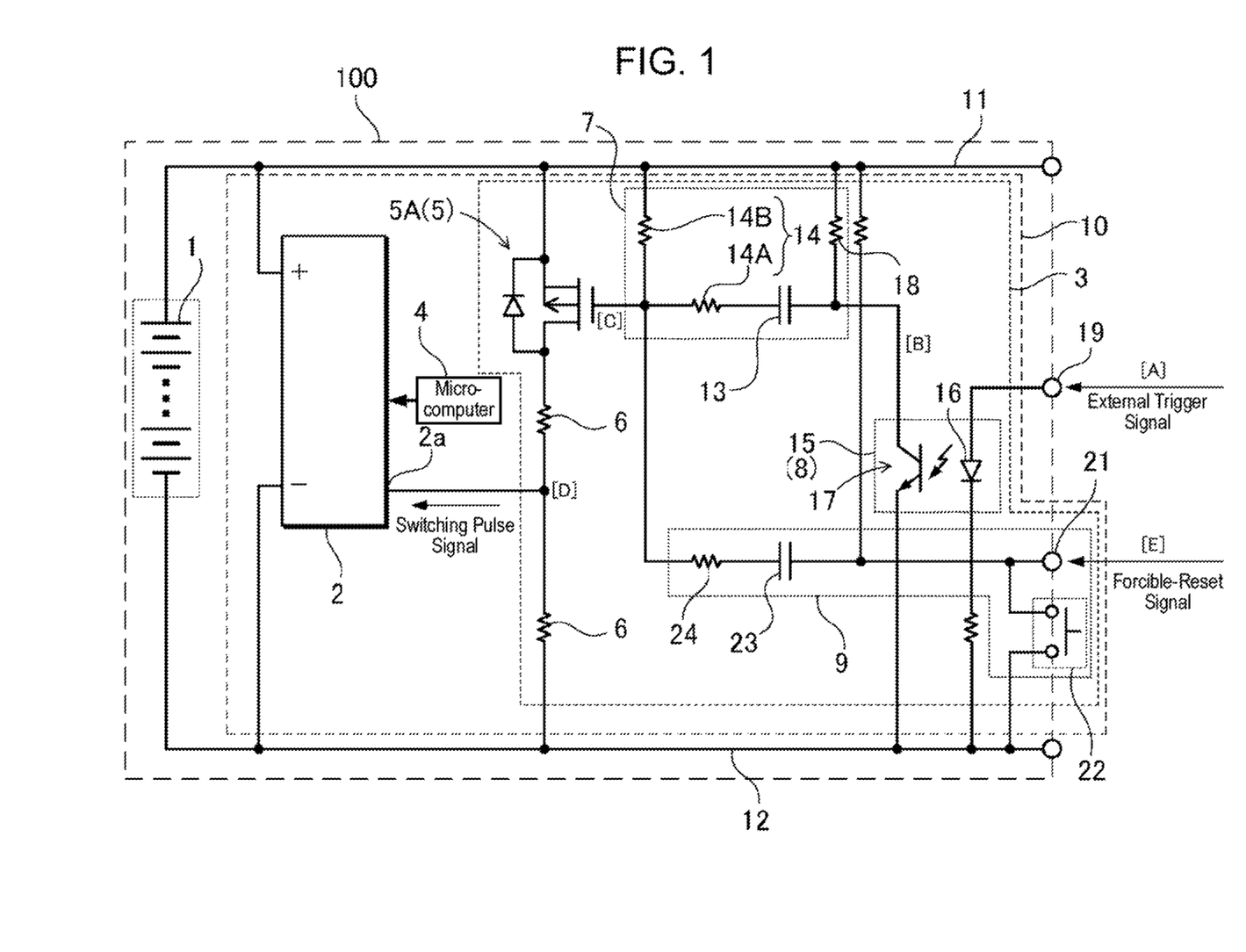
FIG. 1 is a block diagram of a battery pack according to an exemplary embodiment of the prevent invention.

FIG. 1 illustrates battery pack 100 including electronic circuit unit 10. Electronic circuit unit 10 of battery pack 100 is switched to an operating mode while battery pack 100 is connected to a connection device to be charged or discharged. Electronic circuit unit 10 is switched to a power-saving mode while battery pack 100 is not charged or discharged, and reduces that power consumption. Electronic circuit unit 10 in the power-saving mode is switched to the operating mode in response to an external trigger signal input from the connection device.

Electronic Circuit Unit 10

Electronic circuit unit 10 installed in battery pack 100 includes circuit module 2 such as an analog front end (AFE), that includes a protection circuit of battery 1, and trigger circuit 3 configured to switch circuit module 2 to an operating mode. Trigger circuit 3 switches circuit module 2 to the operating mode in response to an external trigger signal input from a device to which battery pack 100 is connected. Trigger circuit 3 inputs, to start-up terminal 2a of circuit module 2, a switching pulse signal that is switched between high and low levels in response to the external trigger signal so as to switch circuit module 2 to the operating mode. Circuit module 2 switched to the operating mode in response to the external trigger signal is switched to a power-saving mode to reduce power consumption, when a predetermined condition, such as no use for a predetermined period of time, is met. Circuit module 2 is switched to the power-saving mode in response to a signal from microcomputer 4 or the like which determines that the condition is met. When start-up terminal 2a is at a high level at the timing of the switching to the power-saving mode by microcomputer 4, circuit module 2 maintains the operating mode and cannot be switched to the power-saving mode. Accordingly, trigger circuit 3 inputs a high-level switching pulse signal to start-up terminal 2a to switch circuit module 2 to the operating mode, and then brings the switching pulse signal to a low level.

Trigger circuit 3 includes semiconductor switching element 5 to which the external trigger signal is input from outside, load resistor 6 for semiconductor switching element 5, one-shot pulse circuit 7 configured to cause the switching pulse signal input to start-up terminal 2a from a high level to a low level after a predetermined period of time, and forcible-reset circuit 9 configured to temporarily turn on semiconductor switching element 5. One-shot pulse circuit 7 includes coupling capacitor 13 connected to an input side of semiconductor switching element 5 and charging resistor 14 connected between coupling capacitor 13 and power line 11. Forcible-reset circuit 9 temporarily inputs an on-voltage to semiconductor switching element 5 to forcibly switch circuit module 2 to the operating mode.

Trigger circuit 3 shown in FIG. 1 includes semiconductor switching element 5 that is p-channel FET 5A. P-channel FET 5A is turned off when the on-voltage is not input thereto from coupling capacitor 13, and is turned on when the on-voltage is input thereto from coupling capacitor 13. P-channel FET 5A energizes load resistor 6 only while being turned on. Load resistor 6 generates a voltage while being energized and inputs a switching pulse signal with a high level to start-up terminal 2a. The switching pulse signal with the high-level input to start-up terminal 2a switches circuit module 2 to the operating mode.

P-channel FET 5A is turned on in response to a negative on-voltage input to the gate thereof, and switches circuit module 2 to the operating mode. Circuit module 2 is switched to the operating mode in response to the external trigger signal with the high level. Hence, in order to turn on p-channel FET 5A at this timing, trigger circuit 3 shown in FIG. 1 connects inverting circuit 8 to the input side of p-channel FET 5A to invert high and low levels of the external trigger signal, and inputs the inverted signal to the gate of p-channel FET 5A.

Inverting circuit 8 in FIG. 1 includes photocoupler 15 including light-emitting diode 16 and phototransistor 17 in which phototransistor 17 includes a collector connected to power line 11 on the positive side via pull-up resistor 18 and an emitter connected to ground line 12. In photocoupler 15 of inversion circuit 8, light-emitting diode 16 is turned on in response to an external trigger signal with a high level, and turns on phototransistor 17. Upon being turned on, phototransistor 17 connects pull-up resistor 18 to ground line 12, and outputs a low-level signal. In photocoupler 15, when light-emitting diode 16 is not turned on due to an external trigger signal with a low level, phototransistor 17 is turned off, and outputs a signal with a high level via pull-up resistor 18. The inverting circuit shown in FIG. 1 includes the photocoupler, the inverting circuit is not limited to the photocoupler, and may include a switching element, such as an FET.

In trigger circuit 3 including inverting circuit 8 connected to the input side of the trigger circuit, when a high-level external trigger signal is input to inverting circuit 8 via external input terminal 19, an on-voltage which is negative with respect to power line 11 on the positive side is input to the gate of p-channel FET 5A, turning on FET 5A. P-channel FET 5A which is turned on inputs the signal with the high level generated across load resistor 6 to start-up terminal 2a as a switching pulse signal, and switches circuit module 2 to the operating mode.

Circuit module 2 may be switched from the operating mode to the power-saving mode. This switching occurs, for example, when battery pack 100 does not supply power to the connection device for a long period of time. When start-up terminal 2a is at a high level, circuit module 2 cannot be switched from the operating mode to the power-saving mode. Hence, in order that the operating mode can be switched to the power-saving mode, start-up terminal 2a needs to be set to a low level after switching to the operating mode.

Trigger circuit 3 includes one-shot pulse circuit 7 in order to forcibly cause start-up terminal 2a from a high level to a low level after switching to the operating mode. One-shot pulse circuit 7 causes a switching pulse signal from a high level to a low level after a predetermined period of time, and converts the switching pulse signal into a one-shot pulse with a predetermined pulse width. One-shot pulse circuit 7 determines the on-time of p-channel FET 5A, and converts the switching pulse signal provided to start-up terminal 2a into a one-shot pulse.

One-shot pulse circuit 7 includes coupling capacitor 13 connected to the input side of FET 5A and charging resistor 14 for coupling capacitor 13. In electronic circuit unit 10 shown in FIG. 1, charging resistor 14 includes a series resistor of first charging resistor 14A which is connected between coupling capacitor 13 and the gate of FET 5A and second charging resistor 14B which connects the gate of FET 5A to power line 11. Second charging resistor 14B connects the gate of FET 5A to power line 11 on the positive side, and maintains FET 5A in an off state in a normal state. The time constant of coupling capacitor 13 and charging resistor 14 is determined by a resistance obtained by the sum of the resistances of first charging resistor 14A and second charging resistor 14B. In this circuit configuration, second charging resistor 14B is also capable of serving as an input resistor that maintains a gate voltage (VGS) of FET 5A to turn off the FET in a normal state. FET 5A includes an input resistor between the gate and the source. The input resistor is connected in parallel with second charging resistor 14B, so that the electrical resistance of second charging resistor 14B substantially decreases. Since the input resistance of FET 5A is considerably large, this can be ignored and the time constant can be determined based on the resistances of first charging resistor 14A and second charging resistor 14B. However, when the input resistance of FET 5A is large, the resistance of second charging resistor 14B is determined in consideration of the input resistance.

The voltage across coupling capacitor 13 becomes the voltage of power line 11 on the positive side when the external trigger signal is low, that is, in the power-saving mode, and the voltage becomes 0V, that is, coupling capacitor 13 is discharged. When a low-level signal is input from inverting circuit 8 to one side of coupling capacitor 13, coupling capacitor 13 starts to be charged via charging resistor 14, and the input voltage input to the gate of p-channel FET 5A drops instantaneously to a low level. In this state, an on-voltage that is negative with respect to the positive-side power line 11 is input to the gate of p-channel FET 5A, and the gate voltage (VGS) which is the potential difference between the gate and the source becomes higher than a cutoff voltage, turning on FET 5A. The voltage across coupling capacitor 13 which is charged increases gradually. As the voltage across coupling capacitor 13 increases, the input voltage input to the gate of p-channel FET 5A gradually increases, and eventually gets back to the voltage of power line 11 on the positive side. In other words, the gate voltage (VGS) of p-channel FET 5A which his turned on gradually decreases as time elapses, becomes lower than the cutoff voltage, and is turned off. The change of the voltage across coupling capacitor 13 thus determines the on-time of FET 5A, that is, the pulse width of the one-shot pulse. The change of the voltage across coupling capacitor 13 is determined by the time constant that is determined by the product of the capacitance of coupling capacitor 13 and the resistance of charging resistor 14. The longer the time constant is, slower the voltage of coupling capacitor 13 changes, which increases the pulse width of the one-shot pulse, that is, increases the on-time of p-channel FET 5A.

The time constant of coupling capacitor 13 and charging resistor 14 is determined such that the pulse width of the one-shot pulse is, for example, equal to or longer than 1 msec. One-shot pulse circuit 7 sets the on-time of p-channel FET 5A to a period equal to or longer than 1 msec, and sets the timing for maintaining start-up terminal 2a at a high level to the period equal to or longer than 1 msec. The pulse width of the one-shot pulse increases by increasing the time constant of coupling capacitor 13 and charging resistor 14, that is, by increasing the capacitance of coupling capacitor 13 and the resistance of charging resistor 14.

Figure 2:
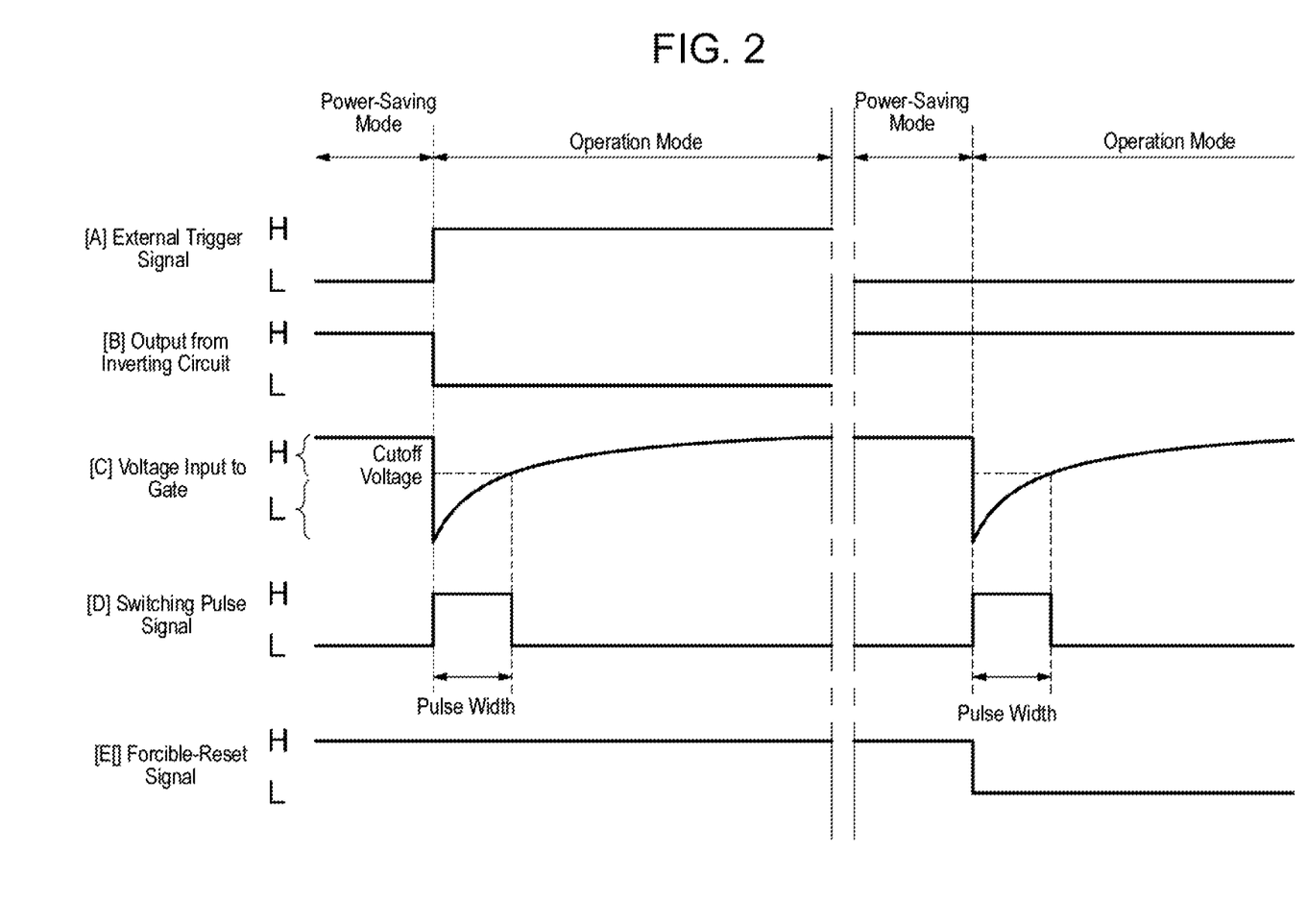
FIG. 2 is a timing chart illustrating an operation of an electronic circuit unit of the battery pack illustrated in FIG. 1.

FIG. 2 is a timing chart indicating changes of [A] the external trigger signal, [B] the output signal of the inverting circuit, [C] the input voltage of the gate of the FET, [D] the switching pulse signal, and [E] the forcible-reset signal in electronic circuit unit 10 illustrated in FIG. 1. In FIG. 2, [C] indicates that the input voltage input from coupling capacitor 13 to the gate of p-channel FET 5A changes. As indicated in FIG. 2, the input voltage input to the gate of FET 5A instantaneously drops to a low level at the timing when the external trigger signal rises from a low level to a high level, that is, when the output signal of inverting circuit 8 changes from the high level to the low level and coupling capacitor 13 starts to be charged. The input voltage then gradually returns to the voltage of power line 11 on the positive side. P-channel FET 5A is maintained to be turned on when the difference between the input voltage of the gate and the voltage of power line 11 on the positive side, that is, the gate voltage (VGS), which is the potential difference between the gate and the source, is higher than the cutoff voltage. Accordingly, when the gate voltage (VGS) of p-channel FET 5A becomes lower than the cutoff voltage, the input voltage of the gate is brought high, turning off p-channel FET 5A. The on-time of p-channel FET 5A is determined by the state in which the gate voltage (VGS) changes, that is, the time constant of coupling capacitor 13 and charging resistor 14. By increasing the time constant and slowing down a decrease in gate voltage (VGS), p-channel FET 5A is maintained to be turned on longer. Hence, the pulse width of the one-shot pulse increases by increasing the time constant. The time constant of coupling capacitor 13 and charging resistor 14 is determined such that the pulse width of the one-shot pulse is, for example, equal to or longer than 1 msec and equal to or shorter than 100 msec, preferably equal to or longer than 1 msec and equal to or shorter than 10 msec. An increase of the pulse width of the one-shot pulse increases the capacitance of coupling capacitor 13 and the electrical resistance of charging resistor 14, leading to large components and high cost. In contrast, the pulse width that is excessively short may prevent switching from being reliably performed. Accordingly, the above ranges are determined such that switching to the operating mode is reliably performed in consideration of the component cost.

Trigger circuit 3 shown in FIG. 1 includes forcible-reset circuit 9 configured to temporarily turn on FET 5A of semiconductor switching element 5. Forcible-reset circuit 9 temporarily inputs an on-voltage to the gate of FET 5A, which is semiconductor switching element 5, to turn on FET 5A, and inputs a one-shot pulse to start-up terminal 2a. A one-shot pulse with a high level forcibly switches circuit module 2 to the operating mode.

Forcible-reset circuit 9 in FIG. 1 has the same circuit configuration as one-shot pulse circuit 7. Forcible-reset circuit 9 temporarily turns on FET 5A, and inputs a one-shot pulse to start-up terminal 2a of circuit module 2. Forcible-reset circuit 9 includes a series circuit of coupling capacitor 23 and charging resistor 24, and includes reset terminal 21 on the input side of coupling capacitor 23. When a low-level signal, which is the forcible-reset signal illustrated in [E] of FIG. 1, is input to reset terminal 21, p-channel FET 5A of semiconductor switching element 5 is turned on. When the low-level signal is input to reset terminal 21, coupling capacitor 23 starts to be charged via charging resistor 24, and the input voltage input to the gate of p-channel FET 5A drops instantaneously to a low level. In this state, an on-voltage that is negative with respect to power line 11 on the positive side is input to the gate of p-channel FET 5A, and the gate voltage (VGS), which is the potential difference between the gate and the source, becomes higher than the cutoff voltage, turning on FET 5A. The voltage across coupling capacitor 23 that is charged increases gradually. As the voltage across coupling capacitor 23 increases, the input voltage input to the gate of p-channel FET 5A gradually increases, and eventually returns to the voltage of power line 11 on the positive side. In other words, the gate voltage (VGS) of p-channel FET 5A in an on state gradually decreases as time elapses, and becomes lower than the cutoff voltage, turning off p-channel FET 5A. Accordingly, p-channel FET 5A is maintained to be turned on until coupling capacitor 23 is charged by charging resistor 24 and the gate voltage (VGS) drops to the cutoff voltage.

P-channel FET 5A which is turned on generates a high-level signal at start-up terminal 2a connected to load resistor 6. Accordingly, a one-shot pulse with a pulse width that is equal to the period of time during which p-channel FET 5A is maintained to be turned on is input to start-up terminal 2a. At the time of rising, the one-shot pulse provided to start-up terminal 2a switches circuit module 2 in the power-saving mode to the operating mode.

In forcible-reset circuit 9 described above, the time constant determined by coupling capacitor 23 and charging resistor 24 is preferably set to substantially the same as the time constant determined by coupling capacitor 13 and charging resistor 14 of one-shot pulse circuit 7 described above.

Forcible-reset circuit 9 in FIG. 1 further includes short-circuiting switch 22 connected to the input side of coupling capacitor 13. Short-circuiting switch 22 connects the input side of coupling capacitor 23 to ground line 12 while being turned on, and inputs an on-voltage to the gate of p-channel FET 5A of semiconductor switching element 5. When the input side of coupling capacitor 23 is connected to ground line 12, coupling capacitor 23 starts to be charged via charging resistor 24, and the input voltage input to the gate of p-channel FET 5A instantaneously drops to a low level, turning on FET 5A. P-channel FET 5A is maintained to be turned on until coupling capacitor 23 is charged by charging resistor 24 and the gate voltage (VGS) drops to the cutoff voltage, and inputs a one-shot pulse to start-up terminal 2a. At the time of rising, circuit module 2 in the power-saving mode is switched to the operating mode. Short-circuiting switch 22 is, for example, a push-button switch. While the circuit unit is disconnected from the connection device, the user may press the push-button switch to switch the power-saving mode to the operating mode.

Electronic circuit unit 10 shown in FIG. 1 is switched between the power-saving mode and the operating mode by the following operation to switch the operating mode to the power-saving mode.

1. An external trigger signal is input to electronic circuit unit 10 from the connection device. As illustrated in [A] of FIG. 2, the external trigger signal changes from a low level to a high level at the timing of switching from the power-saving mode to the operating mode.

The high and low levels of the external trigger signal is inverted by inverting circuit 8 and the external trigger signal is input to coupling capacitor 13 of trigger circuit 3.

As illustrated in [A] of FIG. 2, the external trigger signal rises from a low level to a high level at the timing of switching from the power-saving mode to the operating mode. Hence, as illustrated in [B] of FIG. 2, the signal input to coupling capacitor 13 from inverting circuit 8 changes from a high level to a low level at the timing of switching to the operating mode.

2. When a low-level signal is input to coupling capacitor 13, the input voltage input to the gate of p-channel FET 5A drops significantly to a voltage negative with respect to the voltage of power line 11 on the positive side as illustrated in [C] of FIG. 2. The low on-voltage is input to the gate of p-channel FET 5A, turning on p-channel FET 5A.

P-channel FET 5A which is turned on energizes load resistor 6 and inputs the high-level signal generated across load resistor 6 to start-up terminal 2a of circuit module 2 as a switching pulse signal. The switching pulse signal with the high level input in the operating mode switches circuit module 2 to the operating mode.

3. Subsequently, as coupling capacitor 13 is charged by charging resistor 14 and the voltage across coupling capacitor 13 increases, the input voltage of the gate gradually increases as illustrated in [C] of FIG. 2, and the gate voltage (VGS) which is the potential difference between the gate and the source gradually decreases. When the gate voltage (VGS) becomes equal to or lower than the cutoff voltage, p-channel FET 5A is turned off.

P-channel FET 5A which is turned off cuts off the current of load resistor 6, and causes the switching pulse signal input to start-up terminal 2a of circuit module 2 to be at a low level.

The switching pulse signal input to start-up terminal 2a is a one-shot pulse with a pulse width that is equal to the period of time from when p-channel FET 5A is turned on to when p-channel FET 5A is turned off.

Accordingly, in electronic circuit unit 10 described above, when a predetermined period of time elapses after a high-level external trigger signal is input to external input terminal 19 and the power-saving mode is switched to the operating mode, start-up terminal 2a is at a low level so that switching to the power-saving mode can be performed.

4. Circuit module 2 in which start-up terminal 2a is maintained at the low level is switched to the power-saving mode in response to a signal from microcomputer 4, so that power consumption is reduced.

5. In order to switch circuit module 2 in the power-saving mode to the operating mode while being disconnected from the connection device, a forcible-reset signal is input to reset terminal 21 or a push-button switch which is short-circuiting switch 22 is pressed to input an on-voltage to the gate of p-channel FET 5A. Similarly to one-shot pulse circuit 7, p-channel FET 5A which is turned on energizes load resistor 6 and inputs the high-level signal generated across load resistor 6 as a switching pulse signal to start-up terminal 2a of circuit module 2. The high-level switching pulse signal input in the operating mode switches circuit module 2 to the operating mode.

6. After that, as coupling capacitor 23 is charged and the voltage across coupling capacitor 23 increases, the input voltage of the gate gradually increases as illustrated in [C] of FIG. 2, and the gate voltage (VGS) which is the potential difference between the gate and the source decreases gradually. When the gate voltage (VGS) becomes equal to or lower than the cutoff voltage, p-channel FET 5A is turned off.

P-channel FET 5A which is turned off cuts off the current of load resistor 6, and causes the switching pulse signal input to start-up terminal 2a of circuit module 2 to be at a low level.

The switching pulse signal input to start-up terminal 2a is a one-shot pulse with a pulse width that is equal to a period of time from when p-channel FET 5A is turned on to when p-channel FET 5A is turned off.

Accordingly, in electronic circuit unit 10 described above, a forcible-reset signal is input to reset terminal 21 or a push-button switch which is short-circuiting switch 22 is pressed while battery pack 100 is disconnected from the connection device, so that a high signal is input to start-up terminal 2a as a switching pulse signal to forcibly switch circuit module 2 to the operating mode.

Battery Pack 100

Battery pack 100 illustrated in FIG. 1 includes electronic circuit unit 10 with the above configuration and chargeable battery 1. Battery pack 100 is configured to supply operating power from built-in battery 1 to circuit module 2, semiconductor switching element 5, and microcomputer 4 of electronic circuit unit 10.

INDUSTRIAL APPLICABILITY

The present invention can be suitably used as an electronic circuit unit built in a battery pack capable of reducing power consumption in the power-saving mode by switching between the operating mode and the power-saving mode.

| REFERENCE MARKS IN THE DRAWINGS | |
|---|---|
| 100 | battery pack |
| 1 | battery |
| 2 | circuit module |
| 2a | start-up terminal |
| 3 | trigger circuit |
| 4 | microcomputer |
| 5 | semiconductor switching element |
| 5A | FET |
| 6 | load resistor |
| 7 | one-shot pulse circuit |
| 8 | inverting circuit |
| 9 | forcible-reset circuit |
| 10 | electronic circuit unit |
| 11 | power line |
| 12 | ground line |
| 13 | coupling capacitor |
| 14 | charging resistor |
| 14A | first charging resistor |
| 14B | second charging resistor |
| 15 | photocoupler |
| 16 | light-emitting diode |
| 17 | phototransistor |
| 18 | pull-up resistor |
| 19 | external input terminal |
| 21 | reset terminal |
| 22 | short-circuiting switch |
| 23 | coupling capacitor |
| 24 | charging resistor |
| 80 | electronic circuit unit |
| 82 | circuit module |
| 82a | start-up terminal |
| 83 | trigger circuit |
| 85 | FET |
| 86 | load resistor |
| 88 | inverting circuit |
| 89 | external input terminal |
| 91 | power line |
| 92 | ground line |

| REFERENCE MARKS IN THE DRAWINGS | |
|---|---|
| 95 | short-circuiting FET |
| 96 | short-circuiting circuit |

The invention claimed is:

1. An electronic circuit unit comprising:
a trigger circuit configured to output a switching pulse signal in response to an external trigger signal provided to an external input terminal; and
a circuit module including a start-up terminal, the circuit module is configured to operate in an operating mode and a power-saving mode which are switched in response to the switching pulse signal from the trigger circuit to the start-up terminal, wherein
the trigger circuit includes:
 a semiconductor switching element configured to output the switching pulse signal to the start-up terminal in response to the external trigger signal;
 a load resistor for the semiconductor switching element;
 a one-shot pulse circuit configured to convert the switching pulse signal to be input to the start-up terminal into a one-shot pulse with a predetermined pulse width; and
 a forcible-reset circuit connected to an input side of the semiconductor switching element, the forcible-reset circuit being configured to temporarily turn on the semiconductor switching element,
the start-up terminal is connected to a node connected to the semiconductor switching element and the load resistor,
the one-shot pulse circuit includes:
 a first coupling capacitor connected to the input side of the semiconductor switching element; and
 a first charging resistor for the first coupling capacitor,
the predetermined pulse width of the one-shot pulse is determined by a time constant of the first coupling capacitor and the first charging resistor, and
the forcible-reset circuit is configured to temporarily input an on-voltage to the semiconductor switching element so as to forcibly switch the circuit module to the operating mode.

2. The electronic circuit unit according to claim 1, wherein
the forcible-reset circuit includes:
 a series circuit including a second coupling capacitor and a second charging resistor; and
 a reset terminal connected to an input side of the second coupling capacitor, and
the forcible-reset circuit is configured to temporarily turn on the semiconductor switching element in response to a forcible-reset signal input to the reset terminal.

3. The electronic circuit unit according to claim 1, wherein
the forcible-reset circuit includes:
 a series circuit including a second coupling capacitor and a second charging resistor; and
 a short-circuiting switch connected to an input side of the second coupling capacitor of the forcible-reset circuit, and
the short-circuiting switch is configured to, upon being turned on, connect the input side of the second coupling capacitor to a ground line so as to temporarily turn on the semiconductor switching element.

4. The electronic circuit unit according to claim 1, wherein the time constant is determined by a capacitance of the first coupling capacitor and a resistance of the first charging resistor such that the predetermined pulse width of the one-shot pulse is equal to or longer than 1 msec.

5. The electronic circuit unit according to claim 1, wherein the semiconductor switching element is a field-effect transistor (FET).

6. The electronic circuit unit according to claim 1, wherein
the first charging resistor comprises:
 a second charging resistor connected between the input side of the semiconductor switching element and the first coupling capacitor; and
 a third charging resistor connected between the input side of the semiconductor switching element and a power line, and
the first coupling capacitor is configured to be charged through a series resistance of the second charging resistor and the third charging resistor.

7. The electronic circuit unit according to claim 1, wherein
the circuit module is configured to be switched from the power-saving mode to the operating mode in response to the switching pulse signal with a high level,
the semiconductor switching element is configured to cause the switching pulse signal with a high level to the start-up terminal upon being turned on, and
the one-shot pulse circuit is configured to charge the first coupling capacitor through the first charging resistor to switch the start-up terminal from the high level to a low level.

8. A battery pack comprising:
the electronic circuit unit according to claim 1; and
a chargeable battery, wherein
a voltage of the voltage is configured to be supplied to the electronic circuit unit and the semiconductor switching element.

* * * * *